United States Patent Office 2,715,205
Patented Aug. 9, 1955

2,715,205

REGULATING SYSTEM WITH EXCITER FIELD WINDING IN SERIES WITH ALTERNATOR FIELD WINDING

William L. Ringland, West Allis, Wis., assignor to Allis-Chalmers Manufacturing Company, Milwaukee, Wis.

Application May 18, 1953, Serial No. 355,480

5 Claims. (Cl. 322—28)

This invention relates to an excitation system for an alternating current dynamoelectric machine and more particularly to an improved excitation and regulating system for alternating current electric generators.

A conventional excitation and regulating system for alternators generally includes a direct current dynamoelectric machine for supplying the excitation current to the field winding of the alternator. The direct current machine requires a commutator adding materially to the complexity of the system and to the cost of its maintenance. Moreover, the standard nominal response of such exciters is relatively slow.

Other known excitation and regulating systems include static inductive devices for directly exciting the field of the alternator by direct current supplied through rectifiers from the alternating current circuit of the alternator. Such systems for the direct or self-excitation of the alternator have not been commercially adopted to any appreciable extent, and existing applications apparently have been limited to relatively small capacity machines. Larger static devices are required for the larger capacity alternators in order to supply excitation current thereto between the required greater range of values. Since the time constant of a static device such as a reactor is the ratio of its reactance to its resistance, the time constant of a reactor may be considered as generally proportional to its size. For large alternators, therefore, the static devices have greatly increased time constants, resulting in a system response which is relatively slow.

The slow speed of response is not obviated by an excitation and regulating system having in combination a direct current dynamoelectric machine serving as an exicter and suitable static devices responsive to the regulated characteristic for controlling the direct current exciter, since the response of the exciter is relatively slow.

A proposed regulating system provides an alternating current generator serving as an exciter for an alternator with the exciter receiving its excitation from capacitors connected across its armature circuit. While overcoming many of the disadvantages of excitation and regulating systems heretofore used, the capacitors in the armature circuit of the exciter to supply the required magnetizing current add greatly to the cost of the system. To keep the size of the capacitors at minimum requires that the exciter be designed for minimum size of air gap. Moreover, to provide stability to the exciter to load changes on the alternator, series capacitors are also required which further add to the capacitive excitation to be absorbed in regulation of the exciter and to the cost of the system.

According to the present invention many of the disadvantages of the excitation and regulating systems heretofore used or proposed are obviated. The system of this invention provides an excitation and regulating system for a dynamoelectric machine which receives its excitation current from a self-excited alternating current generator whose voltage is varied in response to changes in the voltage of the dynamoelectric machine.

The self-excited alternating current generator has its field winding connected in series with the field winding of the dynamoelectric machine. A sudden change in the load current of the dynamoelectric machine produces a transient current in its field winding. This transient current immediately causes a change in the excitation of the exciter field, and this change is in the same direction as the change brought about by the closely following regulating action of the system to the change in the load current of the dynamoelectric machine.

The regulating circuit includes magnetic amplifiers having reactance windings connected in the armature circuit of the exciter to draw varying amounts of reactive current therefrom for controlling its terminal voltage. These magnetic amplifiers are relatively small and have relatively small time constants so that the excitation and regulating system has a relatively high speed of response.

It is therefore an object of this invention to provide an improved excitation and regulating system for a dynamoelectric machine which system has a high speed of response.

Another object of the invention is to provide an alternator with an excitation and regulating system including an exciter comprising an alternating current generator whose field current changes in response to transient currents in the field winding of the alternator in anticipation of the action of the regulator.

Objects and advantages other than those above stated will be apparent from the following description when read in connection with the accompanying drawing, in which.

Figure 1:
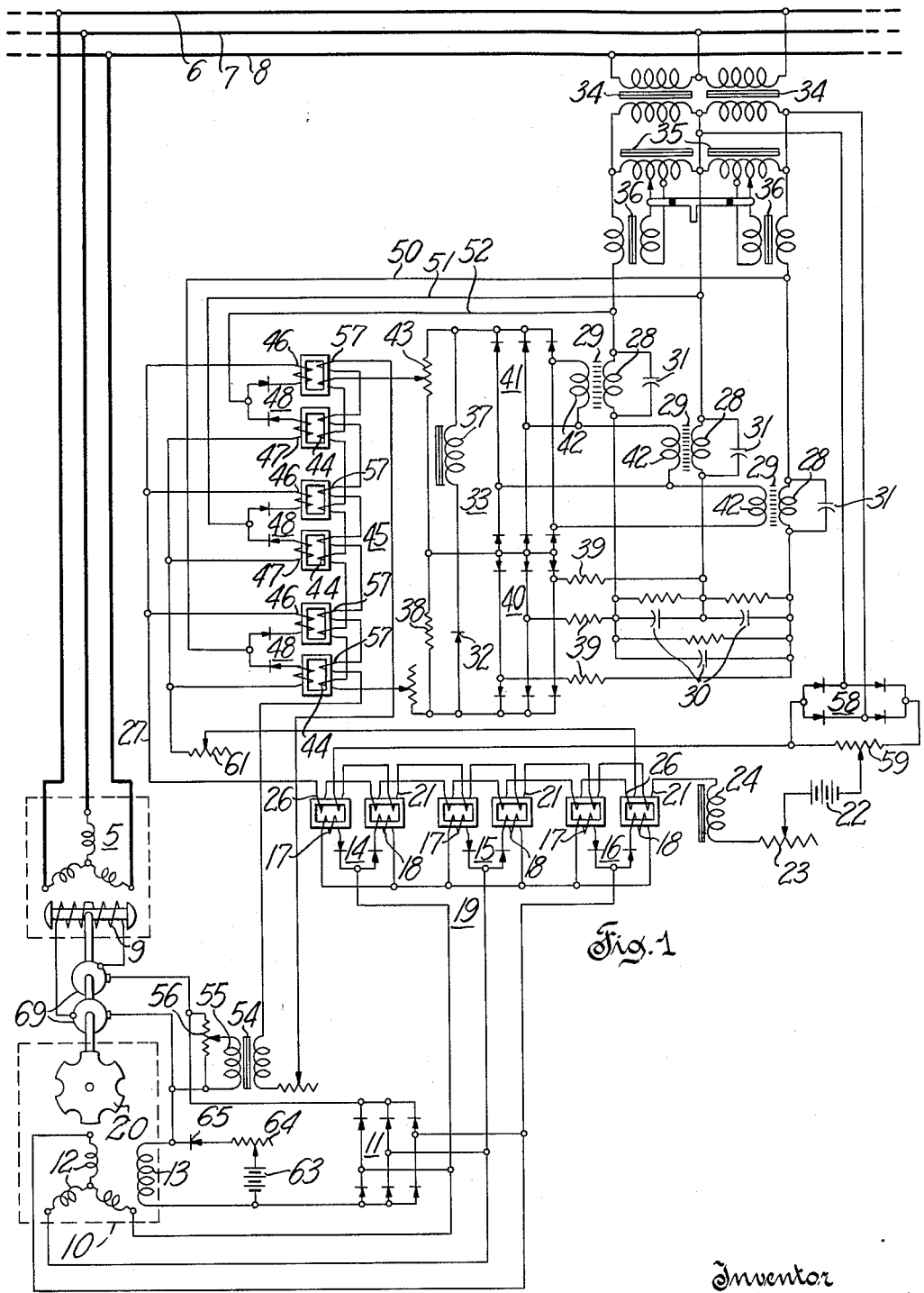
Fig. 1 is a diagrammatic representation of the apparatus and circuits of this invention.
Figure 4:
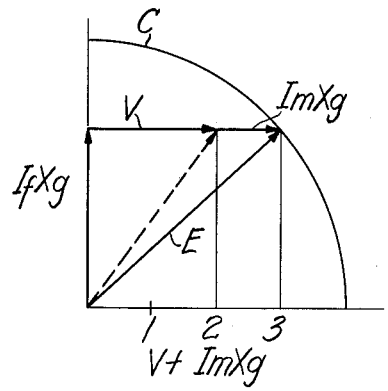
Figure 5:
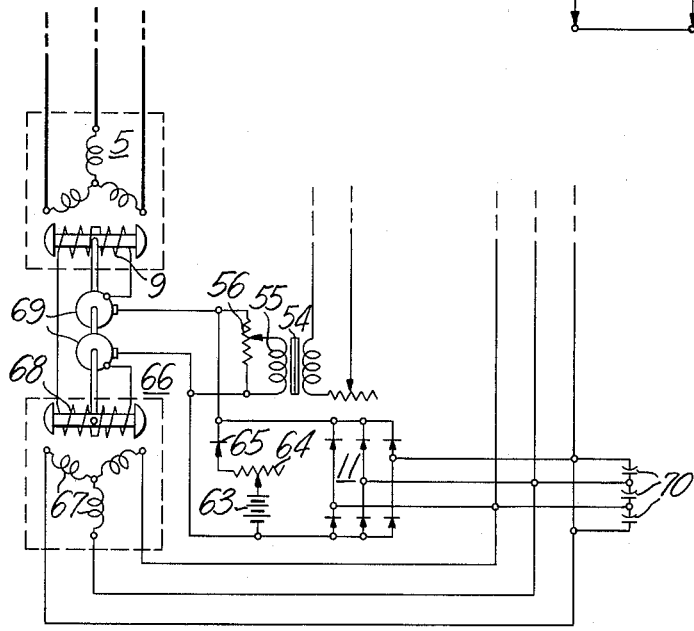

Fig. 4 vectorially illustrates the generated and terminal voltages of the exciter generator; and Fig. 5 shows a modification of the exciter circuit portion of the circuits of Fig. 1.

Referring to Fig. 1 the invention is shown in a system for controlling an electrical characteristic such as the voltage of a dynamoelectric machine 5 which supplies alternating current to a load circuit represented by conductors 6, 7 and 8. Machine 5 may operate at any suitable frequency, such as sixty cycles per second, and is provided with a field winding 9, the energization of which is supplied by a dynamoelectric machine 10.

Machine 10 is any suitable alternating current generator having an armature winding and a field winding. The armature winding may have any number of phases, preferably three. Although the armature and field members may rotate with respect to one another, machine 10 preferably is an inductor generator which has an armature winding 12 and a field winding 13 both wound on the stationary member, and the rotor 20 comprises a laminated steel member notched to provide any suitable number of peripheral teeth and slots such as six teeth and six slots shown in Fig. 1. Feld winding 13 for exciter generator 10 is connected in series with field winding 9 for generator 5 so that transient currents induced in field winding 9 will also appear at full value in the field winding 13 of exciter generator 10. A suitable three phase rectifier 11 connects the three phase armature circuit of generator 10 to the field circuit of generators 5 and 10.

Generator 10 may be driven by any suitable means but is preferably mounted on the shaft of main generator 5 in a suitable known manner. With this arrangement only one set of slip rings 69 is necessary to connect the field winding 9 to field winding 13 and rectifier 11 whether field winding 13 is located on the stator or rotor of the alternating current exciter.

The frequency of the output of generator 10 is proportional to the rotor speed times the number of rotor projections and if driven by a 3600 R. P. M. turbine generator the exciter generator has a frequency of 360 cycles per second which is considerably higher than the frequency of generator 5 which it is assumed has a frequency of sixty cycles.

Figure 2:
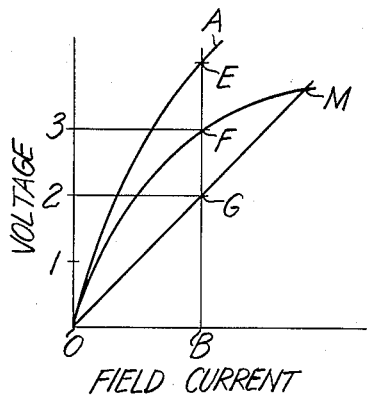
Fig. 2 is a graph, the curves of which represent characteristics of a self-excited generator.

The voltage of exciter generator 10 is determined by the machine characteristics, by the value of the excitation current supplied to it, and by its connected load. Fig. 2 shows typical curves for machine 10, such as the no load saturation characteristic OA, load characteristic OFM for a unity power factor load, and a straight line OGM through the origin whose slope represents the total resistance of field windings 9 and 13. The terminal voltage of machine 10 if the machine is connected to a variable resistance load is shown in Fig. 2 by curve OFM.

However, the terminal voltage of machine 10 is varied by regulating means comprising a magnetic amplifier 19 which is a full wave bridge amplifier comprising inductive reactors 14 to 16 connected in Y across three phase armature winding 12 of machine 10. Each inductive reactor has reactance windings 17 and 18 connected in parallel with each other through half wave rectifiers oppositely connected with respect to the current flow of the windings to provide self-saturation of the reactor cores. In response to variations in the regulated characteristic of machine 5 the reactance of windings 17 and 18 is varied which varies the reactive load on machine 10.

Figure 3:
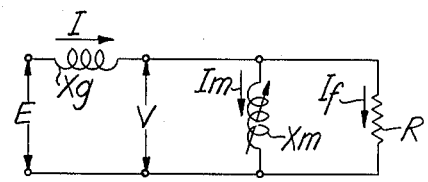
Fig. 3 is an equivalent circuit for the exciter generator.

The equivalent circuit of machine 10 is shown in Fig. 3, in which E is the generated voltage, $Xg$ is the reactance of the generator, V is the terminal voltage of the generator, $Xm$ is the variable reactance of shunt windings 17 and 18 of magnetic amplifier 19, R is the resistance of the field circuit, I is the armature current, $Im$ is the reactive current in the shunt windings, and $If$ is the power current in the field windings. The vector equation for the terminal voltage is $$V = E - IXg$$
$$= E - IfXg - ImXg$$

which voltages are further illustrated vectorially in Fig. 4.

When machine 5 carries full load current, its field winding 9 requires excitation current OB, Fig. 2, which is also the current in field winding 13 of exciter generator 10. Field current OB causes machine 10 to generate a voltage E as indicated on curve A. The terminal voltage required, however, to produce field current OB corresponds to point G on the field resistance line. The difference EG between the generated voltage E and the terminal voltage G is caused by the generator's internal voltage drop $IXg$ which is the product of the generator load current and generator reactance. The reactive component $Im$ of generator load current I produces a voltage drop $ImXg$ in the generator and this voltage drop, which is in phase with the terminal voltage, corresponds to the portion FG of the voltage difference EG.

If the reactive load current $Im$ were zero, field current OB would cause generator 10 to have the same generated voltage E and a terminal voltage corresponding to point F in the unity power factor load characteristic OFM, which defines the locus of the terminal voltage when armature current is equal to field current $If$.

Terminal voltage corresponding to point F, however, would supply excitation current to the field windings in excess of field current OB. Therefore, magnetic amplifier 19 is adjusted so that it will draw a reactive current $Im$ to cause a voltage drop $ImXg$, Fig. 4, which causes the terminal voltage V to correspond to point G, Fig. 2. This terminal voltage V results in the desired value of field current OB. For a given field current, such as OB, the amplitude of generated voltage E remains constant but varies phase relationship with the terminal voltage for varying values of shunt reactance $Xm$, as shown in Fig. 4, wherein the locus of the generated voltage is defined by the portion of circle C.

If generator 5 calls for an increase in excitation current, the reactive current $Im$ is decreased, resulting in an increase in terminal voltage and an increase in field current. The increase in field current causes machine 10 to generate more voltage and tend to result in greater terminal voltage. Controlled variation variation of the shunt reactance and the saturation of generator 10 effect the desired terminal voltage and field current.

In order to obtain a rapid speed of response for the system, it is desirable to have available an increment of voltage FG which is about fifty percent of the operating voltage BG. This additional or forcing voltage is the voltage drop $ImXg$ which is the product of the shunt reactance current and the reactance of the exciter generator. A large value of generator reactance $Xg$ therefore will require proportionately smaller shunt reactance current and a smaller magnetic amplifier to produce a predetermined change in the terminal voltage.

To insure build up of voltage upon loss of residual magnetism of the exciter, means supplying a bias current to field winding 12 comprises a source of unidirectional voltage 63 connected across field winding 13 through an adjustable resistor 64 and a rectifier 65 which blocks reverse flow of current when the voltage across field winding 13 from rectifier 11 exceeds the voltage from source 63.

The cores of magnetic amplifier 19 are each provided with a bias winding 21 and these windings 21 are connected in series with each other and with a source of unidirectional voltage 22 and an adjustable resistor 23. A reactor 24 is also connected in series in this circuit for protection against alternating current which may be induced therein.

The cores of magnetic amplifier 19 each also have a control winding 26. These windings are series connected to form a control circuit 27 which receives control current to vary the saturation of the cores to vary the reactance of windings 17 and 18.

Means responsive to the variations in the voltage of machine 5 to supply control current to control windings 26 includes a regulator 33 which supplies a control voltage having a polarity and a magnitude dependent on the direction and magnitude of the variations in the voltage of machine 5. The regulator may be of any suitable type, but is shown as the regulator disclosed in Patent No. 2,576,646. This regulator comprises a plurality of nonlinear resonant circuits, each circuit comprising the primary winding 28 of a saturable transformer 29 connected in series with a capacitor 30. Each winding 28 may be shunted by a small capacitor 31 for sharpening the point of resonance of the nonlinear circuits. One such nonlinear circuit is provided in each phase of the system and the circuits are energized by a measure of the voltage of machine 5 through transformers 34 connected to conductors 6, 7 and 8, autotransformers 35 and booster transformers 36.

Capacitors 30 are connected to a resistor 38 through voltage reducing resistors 39 and a three phase rectifier 40 to impress on resistor 38 a rectified voltage proportional to the average of the voltages of capacitors 30. A similar three phase rectifier 41 is connected across secondary windings 42 of saturable transformers 29 to produce another rectified voltage which is proportional to the average of the voltages of primary windings 28 and which is impressed on resistor 43. Rectifiers 40 and 41 are connected so the voltage of resistor 38 opposes the voltage of resistor 43. The control voltage of the regulator then is the voltage across resistor 38 and an adjustable portion of resistor 43 through an adjustable tap on resistor 43. This control voltage, which varies in polarity and in magnitude dependent on variations in the regulated voltage of machine 5 from a predetermined value, may be impressed directly on the control windings 26 of magnetic amplifier 19, but is preferably impressed as shown on series connected control windings 44 of a magnetic preamplifier 45. A rectifier 32 and a reactor 37 may be connected across the noncommon terminals of resistors 38 and 43 to provide means for limiting the amplitude of the control voltage applied to the preamplifier in a direction tending to decrease the excitation of machine 5.

The preamplifier 45 comprises suitable saturable reactors 48 having reactance windings 46, 47 energized from a supply circuit 50, 51 and 52 connected to generator 5 through circuit 6, 7 and 8, transformers 34, autotransformers 35 and booster transformers 36. Thus, the supply voltage for reactance windings 46 is proportional to the voltage of generator 5. Each reactor 48 has two cores each of which has a reactance winding 46 or 47.

The winding 46 of one reactor is connected in series with one of the conductors of supply circuit 50, 51 and 52, a half wave rectifier and one terminal of control circuit 27 including windings 26 with the rectifier connected for current flow from the supply circuit to the control circuit. The winding 47 of this reactor is connected in series with the same conductor of the supply circuit, a half wave rectifier and the other terminal of the control circuit, with the rectifier in this circuit oppositely connected for circuit flow from the control circuit to the supply circuit 27.

The reactance windings 46, 47 of each of the other reactors 48 are similarly connected to another of the conductors of the supply circuit and of the control circuit, whereby reactance windings 46 are connected in Y to the supply circuit, reactance windings 47 are also connected in Y to the supply circuit, and the control circuit 27 is connected between the common terminals of the Y connected reactance windings. The voltage of control circuit 27 is determined by the voltage of supply circuit 50, 51 and 52 and the voltage across the reactance windings of the preamplifier. The preamplifier reactance voltage is varied by the action of regulator 33.

To further the speed of response of the system, a bias voltage dependent only on the voltage of machine 5 is impressed on the bias windings 21 of magnetic amplifier 19. Such voltage is obtained by means of a full wave rectifier 58 whose alternating current terminals are connected across a secondary winding of transformer 34 and whose direct current terminals are shunted by a resistor 59. One terminal of resistor 59 and an adjustable tap thereon connect an adjustable portion of resistor 59 in series with bias windings 21 and the source 22 of bias voltage.

Suitable damping means such as a transformer 54 having a primary winding 55 connected across field winding 9, or, as shown, across a portion of a resistor 56 shunting the field winding, and a secondary winding connected to preamplifier control windings 57, are provided to prevent hunting of the system. A resistor 61 added to the control circuit 27 increases the speed of response of magnetic amplifier 19.

In operation, when a normal or predetermined voltage is present in the load circuit 6, 7, and 8 of machine 5, regulator 33 does not supply any voltage to control windings 44 of the preamplifier. Without current in control winding 44 the preamplifier supplies a predetermined current to control windings 26. This control current in windings 26 is in a direction to add to the saturation of the cores of magnetic amplifier 19 caused by the self-saturating reactance windings 17 and 18. Current in bias windings 21 is in a direction to decrease saturation of the cores, and the value of such current is chosen so that each of the reactors 14 to 16 of magnetic amplifier 19 is operated at the desired point in its saturation characteristic. The saturable reactors 48 of the preamplifier 45 and the saturable reactors 14 to 16 of magnetic amplifier 19 are operated near the knee of their saturation characteristics so that very little change in the control current effects considerable change in the current in the output or reactance windings.

When the regulated voltage of machine 5 increases above the normal value, regulator 33 supplies a control voltage of predetermined polarity to windings 44 of preamplifier 45 to cause a relatively large increase in its output current, which in turn causes a relatively large increase in the output current of magnetic amplifier 19. Regulating action such as the change in the output current of magnetic amplifier 19 is initiated by the change in bias current in windings 21 due to the change of voltage on rectifier 58 and resistor 59. The increase in the output current $I_m$ of magnetic amplifier 19 causes a decrease in the terminal voltage of machine 10 and therefore a decrease in the excitation current to machines 5 and 10. The lower voltage of machine 10 causes a decrease in the generated voltages of machines 5 and 10, but this regulating action is damped by the antihunting means comprising transformer 54.

Conversely, when the regulated voltage of machine 5 decreases below normal, regulator 33 supplies a control voltage of reversed polarity to decrease the output of preamplifier 45 and to cause a decrease in the output current of amplifier 19. The decrease in the output current of amplifier 19 is initiated by decrease in the voltage across resistor 59 due to the decrease in the voltage of machine 5. Such decrease in the output current $I_m$ of magnetic amplifier 19 causes a rise in the terminal voltage of machine 10 which therefore supplies more excitation current to machines 5 and 10 to raise their generated voltages.

A change in load on generator 5 produces an induced transient current in field winding 9, which current is in a direction to oppose the change in the voltage on generator 5. The full value of this transient current also flows through the field winding of excited 10 changing its excitation in anticipation of like change in field current to be brought about by the action of the regulator. The terminal voltage of the exciter varies immediately with a change in the shunt reactance because its field current already has been changed by the transient current.

In Fig. 5 is shown a modification of the exciter circuit of Fig. 1. An alternating current exciter 66 comprises relatively rotatable armature and field members such as a stator member provided with an armature winding 67 and a rotor member preferably of the salient pole type provided with a field winding 68 connected in series with field winding 9. Means supplying a bias voltage to field winding 68 comprises a source of unidirectional voltage 63 connected across the output terminals of rectifiers 11 through adjustable resistor 64 and rectifier 65. Rectifier 65 is oppositely poled to rectifier 11. The source of bias voltage 63 supplies a bias current to field winding 9 and to field winding 68 until the output voltage of rectifier 11 exceeds the bias voltage.

Capacitors 70 connected across armature windings 67 are of relatively small size to supply only the harmonic currents required by rectifier 11 so that such currents are not supplied by generator 66. Such harmonic currents would produce appreciable heating losses in the generator if supplied by the generator, but cause only negligible losses when supplied by the capacitors.

Although but two embodiments of the present invention have been shown and described, it will be apparent to those skilled in the art that various changes and modifications may be made therein without departing from the spirit of the invention or from the scope of the appended claims.

It is claimed and desired to secure by Letters Patent:

1. In a regulating system for controlling an electrical characteristic of a dynamoelectric machine having a field winding, the combination of an alternating current generator serving as an exciter for said dynamoelectric machine, said generator having a field winding connected in series with said field winding of said dynamoelectric machine so that transient currents induced in said field winding of said dynamoelectric machine during normal operation thereof are also carried by said field winding of said alternating current generator to vary the voltage thereof in anticipation of the regulating action of the system, a rectifier connecting said generator to said field windings to supply excitation current thereto, and means connected to said dynamoelectric machine responsive to the regulated characteristic thereof to cause said generator to vary the excitation current supplied to said field windings.

2. In a system for controlling an electrical characteristic of a dynamoelectric machine having a field winding, the combination of an alternating current generator serving as an exciter for said dynamoelectric machine and operating at a frequency substantially greater than the frequency of said dynamoelectric machine, said generator having an armature winding and a field winding, said field windings connected in series with each other so that transient currents induced in said field winding of said dynamoelectric machine during normal operation thereof are also carried by said field winding of said alternating current generator to vary the voltage thereof in anticipation of the regulating action of the system, a rectifier connecting said armature winding of said generator to said series connected field windings to supply excitation current thereto, and a saturable reactor having a reactance winding and a control winding, said reactance winding connected in shunt with said armature winding of said generator and said control winding connected to the dynamoelectric machine to be responsive to the voltage thereof to cause said generator to vary the amount of excitation current supplied to said field windings.

3. In a system for controlling an electrical characteristic of a dynamoelectric machine having a field winding, the combination comprising an alternating current generator having a stator provided with an armature winding and a field winding, said field winding of said generator connected in series with said field winding of said dynamoelectric machine so that transient currents induced in said field winding of said dynamoelectric machine during normal operation thereof are also carried by said field winding of said alternating current generator to vary the voltage thereof in anticipation of the regulating action of the system, a rectifier connecting said armature winding to said field windings to supply excitation current thereto, and a saturable reactor having a reactance winding and a control winding, said reactance winding connected in shunt with said armature winding and said control winding connected to the dynamoelectric machine to be responsive to the voltage thereof to cause said generator to vary the amount of excitation current supplied to said field windings.

4. In a regulating system for controlling the voltage of a dynamoelectric machine having a field winding, the combination of an alternating current generator having a field winding connected in series with said field winding of said dynamoelectric machine so that transient currents induced in said field winding of said dynamoelectric machine during normal operation thereof are also carried by said field winding of said alternating current generator to vary the voltage thereof in anticipation of the regulating action of the system, a rectifier connecting said generator to said field windings to supply excitation current thereto, means connected to said dynamoelectric machine responsive to the voltage thereof to cause said generator to vary the excitation current supplied to said field windings, and means supplying a bias current to said field winding of said alternating current generator to supply initial magnetization thereto.

5. In a system for controlling the voltage of a dynamoelectric machine having a field winding, the combination comprising an alternating current generator having a stator provided with an armature winding and a rotor provided with a field winding, said field winding of said generator connected in series with said field winding of said dynamoelectric machine so that transient currents induced in said field winding of said dynamoelectric machine during normal operation thereof are also carried by said field winding of said alternating current generator to vary the voltage thereof in anticipation of the regulating action of the system, a rectifier connecting said armature winding to said field windings to supply excitation current thereto, means connected across said rectifier supplying a current to said field windings to assure initial magnetization of said machines, and a saturable reactor having a reactance winding and a control winding, said reactance winding connected in shunt with said armature winding and said control winding connected to the dynamoelectric machine to be responsive to the voltage thereof to cause said generator to vary the amount of excitation current supplied to said field windings.

References Cited in the file of this patent
UNITED STATES PATENTS 2,238,811     Crever               Apr. 15, 1941